US007233545B2

(12) United States Patent
Harvey, Jr. et al.

(10) Patent No.: US 7,233,545 B2
(45) Date of Patent: Jun. 19, 2007

(54) SYSTEM AND METHOD FOR DETERMINING THE LOCATION OF AN ACOUSTIC EVENT

(75) Inventors: Edward P. Harvey, Jr., Virginia Beach, VA (US); Jack McGinn, Virginia Beach, VA (US)

(73) Assignee: McGinn-Harvey Holdings, LLC, Norfolk, VA (US)

( * ) Notice: Subject to any disclaimer, the term of this patent is extended or adjusted under 35 U.S.C. 154(b) by 0 days.

(21) Appl. No.: 11/221,541

(22) Filed: Sep. 7, 2005

(65) Prior Publication Data

US 2006/0050610 A1 Mar. 9, 2006

Related U.S. Application Data

(60) Provisional application No. 60/607,891, filed on Sep. 8, 2004.

(51) Int. Cl.
*H04B 1/59* (2006.01)
(52) U.S. Cl. ...................................... 367/127
(58) Field of Classification Search .............. 367/5, 367/902, 128, 127, 906
See application file for complete search history.

(56) References Cited

U.S. PATENT DOCUMENTS

| 2,447,069 | A | 8/1948 | Holcomb, Jr. |
| 3,344,420 | A | 9/1967 | Arsove |
| 3,383,649 | A | 5/1968 | Peck et al. |
| 4,794,575 | A | 12/1988 | Miller |
| 4,890,334 | A | 12/1989 | Chien |
| 5,103,432 | A | 4/1992 | Percy |
| 5,119,341 | A | 6/1992 | Youngberg |
| 5,168,473 | A | 12/1992 | Parra |
| 5,184,330 | A | 2/1993 | Adams et al. |
| 5,209,112 | A | 5/1993 | McCoy et al. |
| 5,363,344 | A | 11/1994 | Sofen |
| 5,408,238 | A | 4/1995 | Smith |
| 5,432,754 | A | 7/1995 | Brady et al. |
| 5,449,307 | A | 9/1995 | Fuereder |
| 5,452,262 | A | 9/1995 | Hagerty |

(Continued)

FOREIGN PATENT DOCUMENTS

JP 10079708 A 3/1998

OTHER PUBLICATIONS

Dr. Steven Ackleson, "Unmanned Underwater Vehicle".
"Sonobuoys", Sparton Electronics.

*Primary Examiner*—Dan Pihulic
(74) *Attorney, Agent, or Firm*—Williams Mullen; M. Bruce Harper

(57) ABSTRACT

A system and method is provided for determining the three dimensional location of an acoustic event using a system of five or more sound sensing elements. The sensing elements are positioned at substantially the same elevation and in spatially distributed locations with respect to the acoustic event. The sensing elements generate notification signals indicating occurrence of the acoustic event. A central processor receives the notification signals, associates the locations of each of the sensing elements with the time at which each sensing element sensed the sound, determines the speed of sound for the medium, and calculates a three dimensional location for the acoustic event using a linear error minimization algorithm. A system of six or more sensing elements enables the processor further to discriminate between near simultaneous acoustic events.

19 Claims, 6 Drawing Sheets

U.S. PATENT DOCUMENTS

| | | |
|---|---|---|
| 5,577,942 A | 11/1996 | Juselis |
| 5,579,285 A | 11/1996 | Hubert |
| 5,616,059 A | 4/1997 | Solomon |
| 5,691,957 A | 11/1997 | Spiesberger |
| 5,741,167 A | 4/1998 | Hagerty |
| 6,163,503 A | 12/2000 | Gudbjornsson |
| 6,288,973 B1 | 9/2001 | Joynes |
| 6,317,388 B1 | 11/2001 | Woodsum et al. |
| 2003/0068936 A1 | 4/2003 | Yerazunis et al. |
| 2003/0117893 A1 | 6/2003 | Bary |
| 2003/0152892 A1 | 8/2003 | Huang et al. |
| 2004/0100868 A1* | 5/2004 | Patterson et al. ........... 367/127 |

* cited by examiner

SYSTEM AND METHOD FOR DETERMINING THE LOCATION OF AN ACOUSTIC EVENT

CROSS REFERENCE TO RELATED APPLICATION

The present application claims priority from U.S. Provisional Application Ser. No. 60/607,891, filed Sep. 8, 2004.

BACKGROUND OF THE INVENTION

1. Field of the Invention

The present invention relates to sensing and locating the occurrence of acoustic events. More specifically, the present invention relates to using a two-dimensional array of sound sensors to detect and generate positional information of acoustic events in three dimensions.

2. Description of the Related Art

Determining the three dimensional location of acoustic events in a space using a two-dimensional array of sound sensors presents a variety of challenges. However, successful and accurate implementation would be of considerable usefulness. Some applications may include security surveillance, equipment monitoring, research, etc. One practical application for the present invention is in the field of military weapon firing exercises; in this example, the event is often the detonation or impact of ordnance. Commonly, in waterborne environments, such arrays may take the form of hydrophones located on buoys. The location of a detonation within a training range or buoy field can be used to determine the accuracy of the firing unit. Inherent in any such system will be error in measurement and calculation. Some detonations may occur at elevations above or below the water's surface—outside of the plane of the array. Further, the near simultaneous detonation or occurrence of acoustic events may complicate differentiation of those events.

While the notion of using an array of sound sensors to create such a training range is known, the above described complications produce inaccuracies that reduce effectiveness. The ability to account for these issues is required to make an array or training range more effective, particularly when multiple units are participating (e.g., ships, aircraft, or land based artillery). Error in position information or sound detection may introduce inaccuracies into such systems, regardless of how accurate the sensors and other components might be.

Most array detection methods do not address the effect or complications arising from out of plane events. Some virtual systems estimate the trajectory of the ordnance based on a known firing location and an estimated two dimensional or planar equivalent to the strike location. In general, these systems focus on the plane of the array, as if all acoustic events occurred at the same elevation as the array, which can limit usefulness to certain types of ordnance or certain types of surface units. Further, such systems are limited in their ability to support the training or simulation of air and undersea assets.

The complications of near-simultaneous acoustic events have prompted two general approaches. In exercises where multiple units fire into the same space or range, some prior technologies delay the rate of firing in order to separate the performance of the various units, and to permit allocation of a detonation to a particular unit. Of course, this assumes that such a delay in firing does not reduce the efficacy of the training, the exercise performance, or ultimately the performance in combat.

The U.S. Department of Defense Live Fire Testing and Training Program uses an array of sound sensors to detect ordnance striking water, called the Integrated Maritime Portable Acoustic Scoring and Simulator (IMPASS). This system is directed to detection of events at the two dimensional plane of the water's surface. Further, the IMPASS acoustic scoring buoy system disables the detection circuit for a predetermined time after a first sound impulse is detected, rendering it impossible to score near-simultaneous detonations in the buoy array. The time delay before a subsequent sound impulse can be detected is predetermined (e.g., a three second delay). Unfortunately, this delay interferes with the ability to detect multiple near-simultaneous detonations in the same buoy array. IMPASS does not sort multiple sound waves or impulses that arrive closely spaced in time at a given buoy's location within the buoy array, which is needed in order to assign a given sound impulse to a specific event. The first sound impulse that arrives at one sensor within an array could be the sound impulse generated from a second event, depending on the sensor location within the array geometry.

Another example of a sensor array within a buoy system is provided by Pub. No. US 2003/0152892 to Paul C. Huang, et al. This approach uses a parallel virtual three dimensional graphical target range (e.g., virtual coastlines) formed from known geographic data along with data from the fire control or weapon system of a participating naval platform. A spotter subsystem links the sensors in the buoy system to the naval weapon system. Additional information may be collected from video or radar monitoring of the range. This approach is directed to detecting an acoustic event in two dimensions for the purpose of calculating an estimate of the trajectory of the ordnance, which is then used in creating a three dimensional graphic display; any error in positioning or in the speed of sound is assumed to be minimal. This use of a buoy array is not directed to the detection of out of plane events, near simultaneous events, or the minimization of error.

BRIEF SUMMARY OF THE INVENTION

The present invention is a system and method for determining the three dimensional location of acoustic events using a two dimensional array of sound sensors. Some embodiments of the invention are further capable of discriminating between near simultaneous acoustic events.

A two dimensional array of five or more acoustic sensors or sensing elements is established over a given area of concern to detect an acoustic event. The invention may be airborne, land based, or waterborne. Thus, embodiments of the invention may vary. The sensors should be at substantially the same elevation (i.e., two dimensional) and not allineated with respect to the acoustic event. The sensing elements are linked to a computer system for determination of the location of the acoustic event.

Sound is a change in pressure, particle velocity, and displacement that travels through a medium having some elasticity. The speed of sound in air is roughly 1,126 ft/s, and varies with temperature. The speed of sound in seawater is roughly 5,100 ft/s, and varies with a number of factors such as temperature, pressure, salinity, etc. A discrete acoustic event will typically produce sound waves that propagate radially from the point of origination, depending on the medium and the circumstances of the event.

A two dimensional array of sensing elements having sound sensors may be established over a given area of concern to detect the sound waves from an acoustic event.

As the change in pressure reaches the sound sensors, the sensors independently capture data regarding the event, which data are processed as described herein. Preferably, the sensors accommodate the media of their deployment. For example, a submerged sensing element may use immersible acoustic sensors or hydrophones, while a waterborne sensing element may use hydrophones below the water level co-located with microphones for sensing sound above the water level. Thus, the sensors may be of any type that is appropriate for the application and medium: dynamic, electrostatic, piezoelectric, magneto-restrictive, or otherwise. The nature of the acoustic event and the environment of use will generally guide those of skill in the art to select an appropriate sound sensor for the sensing elements. In short, a sensing element is an apparatus that includes at least one integrated sound sensor and such additional components, such as a power supply, as may be appropriate and desirable for the application.

When a sensor detects sound, the sensing element notifies a computer system or central processor through a communication interface that the sound reached the location of the sensor at a particular time. The central processor is able to receive and calculate the three dimensional location of the acoustic event based on this data. The location of each sensor is associated with the time at which that sensing element sensed the sound from the acoustic event. Using the speed of sound in the medium and data from the sensors, the processor determines a three dimensional location for an acoustic event that would minimize the total error for the times at which each of the sensors detected sound at their respective locations. If the array comprises six or more sensors, the processor is further capable of discriminating between acoustic events that occur near simultaneously.

The means for determining the position or location of the sensing elements may take a variety of forms, depending on the application. In some cases, the sensing elements (i.e., including the integrated sensors) may be fixed or immobile in known (i.e., predetermined) positions. Alternatively, some arrays having mobile elements may require a means for determining the location or position of the sensing elements at the time of sensing the sound. Thus, for a mobile embodiment such as a drifting array of sound sensing buoys, the system preferably includes the ability to determine the location or position of each buoy with a sensor at least for the time at which an acoustic event is sensed. In some embodiments, this ability may be integrated with the elements. For example, commercially available positioning systems such as Global Navigation Satellite Systems (GNSS) or Global Position System (GPS) may be suitable for many embodiments. Other embodiments may be suited to alternate positioning means (e.g., Loran, RF tracking) known to those in the field may be used. Further, non-integrated means for determining sensor position may also be employed, such as radar (optionally including a buoy mounted radar reflector), optical positioning systems, infra red, tracking grids, etc., may be desirable. Each mobile sensing element may thus be spatially associated with the system for determining position.

The time of event detection at a sensing element may also be determined in a wide variety of ways. Preferably, the entire system is synchronized to a single reference time. The time may be determined using any timing device known in the art for such purpose and appropriate for the application, such as time pieces, chronometers, internal computer clocks, external timing systems, etc. Some positioning systems, such as the timing or clock system of GPS receivers may provide a convenient, common, and extrinsic source for a reference time. Receiver clocks may be aligned to GPS satellite atomic clocks. Alternatively, the time of sensing an acoustic event may be keyed to a central clock by radio or other means, or to individual clocks assigned to or integrated with individual sensors, but synchronized as needed.

The notification signals and the time of sensing from each of the five or more sensors are associated with data describing the two dimensional location of each sensor/sensing element; this information is used by the central processor. If the elements are fixed or immobile, then transmission of a notification signal from the sensing element may be by either a wire free or any appropriate fixed wire/hardwired communication interface, including fiber optic, coaxial, network cabling, etc. Preferably, however, mobile sensing elements will communicate with a processor by wire free transmission for practicability and to avoid limiting sensing element (i.e., sensor) mobility. It is contemplated that some embodiments of sensing elements will include transmitters or transceivers, with a companion receiver in the communication interface linked with the central processor. The receiver would thus be configured to receive the transmitted notification signals; in some embodiments, the receiver may also receive data of sensing element position and a common reference time, as appropriate. In some cases, it may be desirable for a sensing element to transmit a signal continuously or periodically, with an aperiodic notification signal generated and transmitted upon the sensing of sound from an acoustic event. Alternatively, a sensor may be dormant or asleep until the occurrence of an acoustic event, which triggers transmission of a notification signal by the sensing element.

Thus, a typical mobile sensing element may include one or more sound sensors. Some sensing elements may be co-packaged with optional onboard positioning systems, optional reference clocks, optional onboard sensor processor—if required, and an optional transmitter. These optional components are described in greater detail below.

The present invention also includes a computer or central processor for calculating the location of the acoustic event or detonation in a three dimensional space. The processor may be any computer appropriate for the application, typically having a memory, storage, processor, etc. (or "processor" for convenience). The location calculation is based on the time of sensing the sound impulses of an acoustic event by the acoustic sensors and the locations of the various sensor elements making up the array. For the calculation described herein, at least five sensing points are required. An acoustic event, such as an ordnance burst, is independently detected by each of the five or more acoustic sensors integrated in the sensing elements. The sensing elements generate notification signals that are delivered to the central processor via a communication interface. The processor receives the time each of the sensors detected the event and the position or location of the sensor, each having some degree of error. With a common reference system, the processor determines the location of the acoustic event by minimizing the sum of the errors using a linear minimization algorithm.

Figure 1:
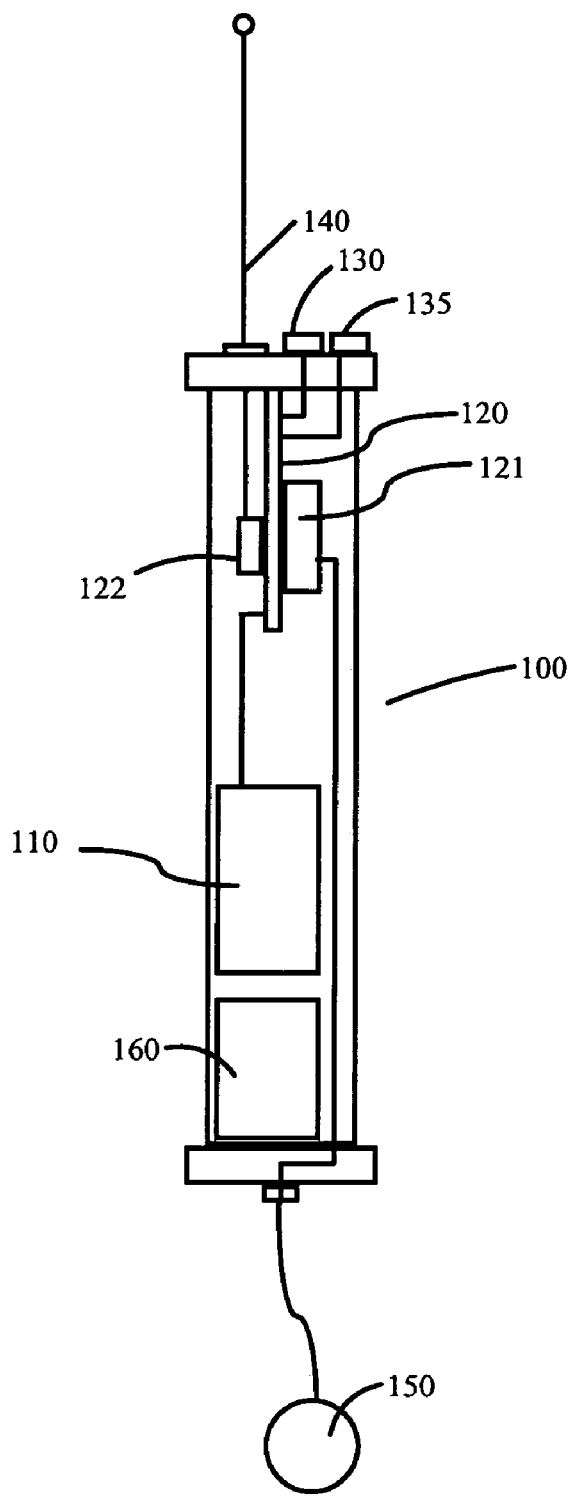
FIG. 1 shows a buoy as an example of a sensing element adapted to sensing sound in water and air while waterborne.

ELEMENT LIST 20 processor
23 communication interface
24 wires
25 receiver
30 acoustic event
35 owl (animal)
51 area of concern
52 body of water
100 illustrative buoy hosting a sensing element
110 power supply
120 circuit card
121 onboard processor
122 transceiver
130 positioning system
135 microphone
140 antenna
150 hydrophone
160 ballast
170 vessel
175 gun
176 antenna
190 notification signal
200 gun order time signal

DETAILED DESCRIPTION OF THE INVENTION

The following detailed description is not to be taken in a limiting sense, but is made merely for the purpose of illustrating general principles of embodiments of the invention.

As introduced above, the present invention is a system for determining the three dimensional location of acoustic events using a two dimensional array of five or more sensing elements having sound sensors of known location. The invention may be disposed in air, on land, and on or in water. Some embodiments of six or more sensing elements may further discriminate between near simultaneous acoustic events. In a simple aspect of the overall system, notification signals indicating an acoustic event from each of five or more elements are associated with data describing the two dimensional location of each sensing element and the time at which each element's sensor detected the acoustic event. This information is collected from each sensor and processed to calculate the three dimensional location of the acoustic event.

With reference to the drawings, an example of a sensing element of the present invention directed to a mobile, waterborne application is shown in FIG. 1. In this example, the sensing element is an illustrative buoy 100 that includes two sensors: sensor hydrophone 150 to detect sound in water and microphone 135 to detect sound in air. Of course, other embodiments may employ a single sensor. In this example, hydrophone 150 is shown outside the hull of buoy 100, but it may also be located within the hull of buoy 100, depending on the application. Optional ballast 160 orients buoy 100, and may be used to establish the proper displacement of buoy 100 within the water. This example of a sensing element is mobile, and is shown having a power supply 110 for circuit card 120, which supports an optional onboard processor 121, transceiver 122, positioning system 130, antenna 140, and the sound sensors 135 and 150, as may be required for the application. Optional onboard processor 121 may provide a reference time by internal clock, or such a reference may be provided by positioning system 130 or from an external system received through antenna 140 and transceiver 122. In one configuration, when hydrophone 150 or microphone 135 detects sound, onboard processor 121 collects position information from positioning system 130, a time of sensing, and transmits the position data along with the time as a notification signal 190 (not shown), using transceiver 122 and antenna 140. Positioning system 130 may provide information about the position or location of buoy 100 continuously, when a sound is detected, or at some other desired frequency. Likewise, hydrophone 150 and microphone 135 may provide continuous sensing for optional onboard processor 121 to record or to transmit continuously, or the sensor element may be in an optional "dormant state" until awakened by a sufficiently strong sound signal. The sound sensors may also be tailored or adapted to a particular sort of sound, such as a desired frequency band or impulse pattern. Alternatively, sound signals may be filtered or profiled by optional onboard processor 121 or some other computer. Those skilled in the art will readily see that the packaging and configuration of sensing elements may vary widely, depending on the application.

Figure 2:
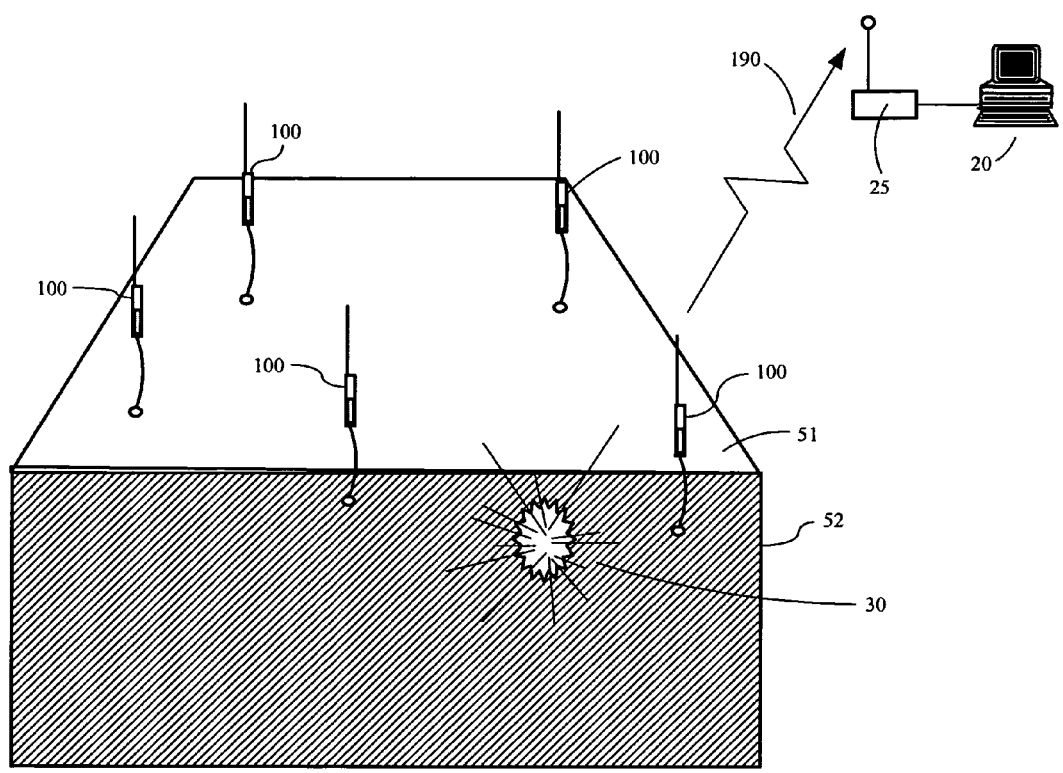
FIG. 2 shows a distribution of sound sensing buoys or a buoy array in an illustrative waterborne embodiment.
Figure 3:
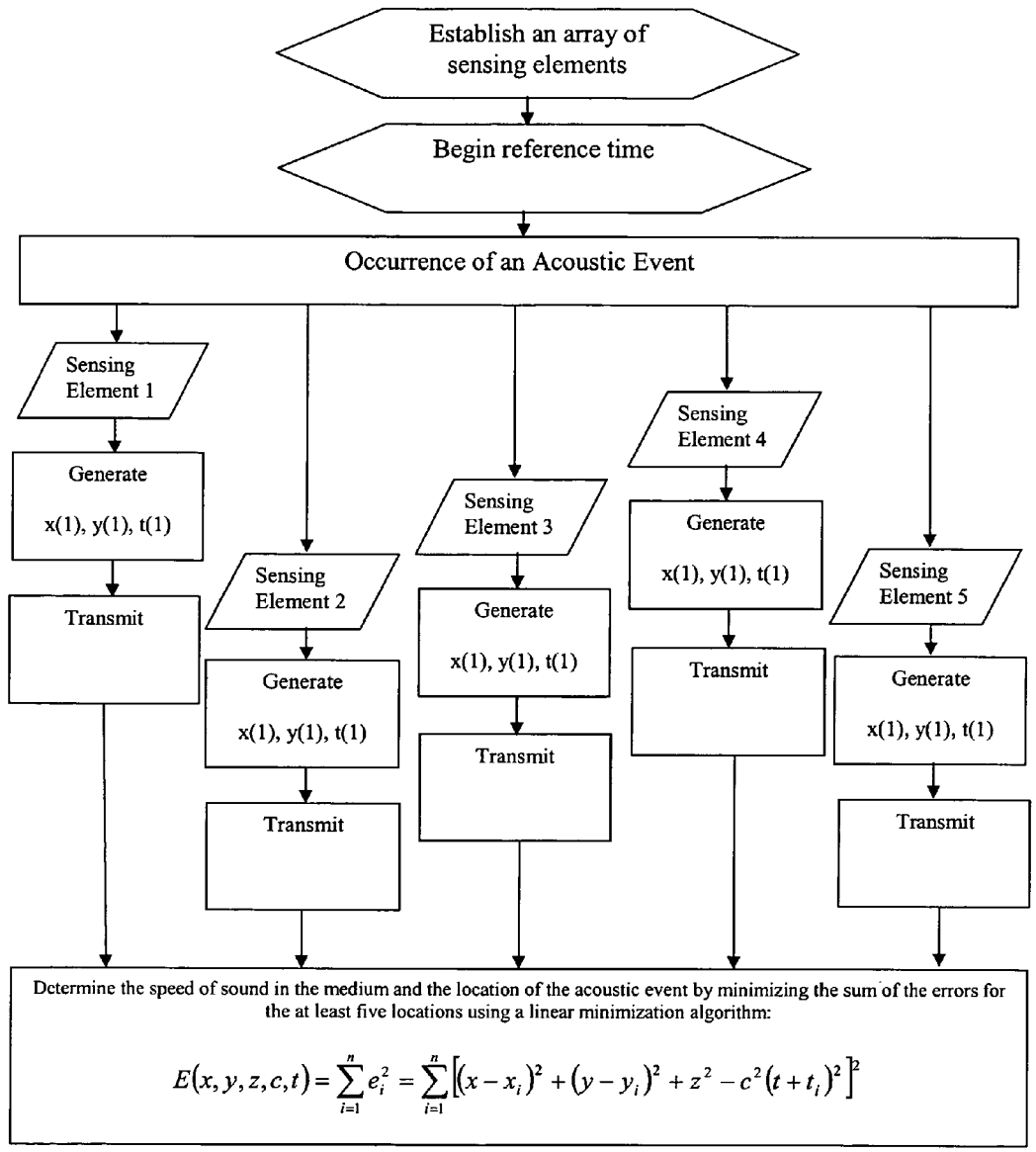
FIG. 3 is a flow chart of the data processing within the present invention for determining the location of an acoustic event.

A representative deployment of buoys 100 in a two dimensional array of sensing elements is shown in FIG. 2. Area of concern 51 is shown at the water level, with shading to denote body of water 52. The horizontal displacement of sensing elements or buoys 100 floating within area of concern 51 may be considered using a common reference system, such as rectangular or Cartesian coordinates, so that each buoy 100 has a position that may be described by x and y coordinates, based on a predetermined reference, or alternatively using latitude and longitude. Thus, the sensors may be described as having horizontal displacement within x and y dimensions, at z=0. Other referencing systems will serve so long as appropriate adjustments are made to the calculations described below. In general, buoys 100 are at substantially the same elevation, subject to sea state, within a two dimensional plane. Distribution of buoys 100 is preferably non allineated with respect to acoustic event 30 for better data acquisition, as described above. In this example, acoustic event 30 is shown as an ordnance or projectile burst within body of water 52 under area of concern 51. The location of acoustic event 30 may be described by its x, y, and z coordinates. This example involves an array of mobile sensing elements having a wire free communication interface; one of the buoys 100 is shown transmitting-its position data along with time of sensing acoustic event 30, as shown by notification signal 190. In other embodiments, a sensing element may transmit a simple notification signal 190 upon sensing an acoustic event 30 of concern, without position, time, or other data, which information may be generated in other ways, as described herein. Receiver 25 picks up notification signal 190 and provides it to the central processor 20 for determining the location of acoustic event 30. FIG. 3 is a flow chart of data acquisition and processing for the sequence of events in the operation of the embodiment in FIG. 2.

Figure 4:
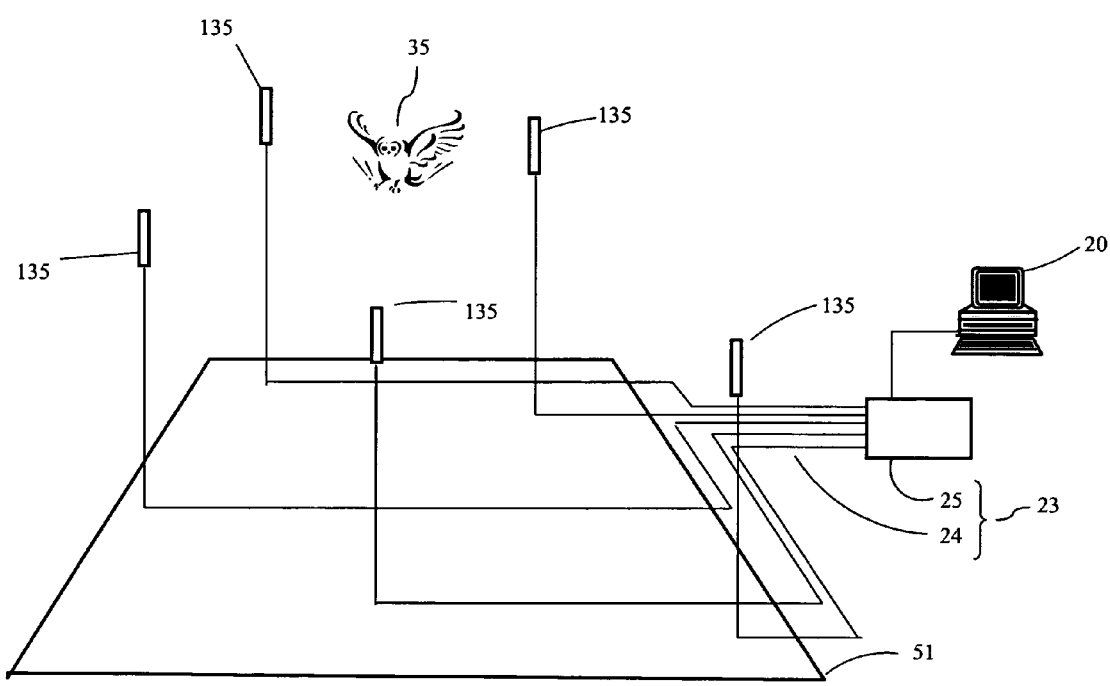
FIG. 4 is an example of a land based application of the present invention adapted for use in research.

A different example is shown in FIG. 4, which depicts an embodiment of the present invention located ashore. The sensing elements in this case include microphones 135, situated in substantially the same elevation (i.e., a two dimensional plane) over area of concern 51. Microphones 135 connect to a hardwired communication interface 23 comprising wires 24 with receiver 25, which communicates the notification signal 190 (not shown) to central processor 20. In this example, acoustic event 30 might be produced by an animal research subject, such as owl 35 located within area of concern 51, perhaps providing information for a research project. The fixed location or position of each of microphones 135 may be stored by central processor 20, which may also supply a reference time from an internal clock as a timer (not shown.) In some cases, it may be desirable for processor 20 to filter or to profile sound data, perhaps using the sound characteristics of sample or prior acoustic events; this feature would enables the discrimination of sounds and generation of a notification signal upon a match of an acoustic event having a certain profile, such as the shriek of owl 35.

The speed of sound (or "c") in the medium of operation of the present invention may be determined by any means appropriate to the application. For example, the speed of sound may be determined from a stored or reference value if variability is not too great for the application. In another case, the speed of sound may be an approximation based on certain measured environmental conditions. In addition, the speed of sound may be calculated using data from sensors that are oriented appropriately to a sound impulse traveling through the array. An array of sensing elements comprising at least five buoys 100, each with a hydrophone 150 and a microphone 135 to detect live fire explosions was illustrated in FIG. 2. A basic x-y planar determination of distance "d" between a first buoy (or buoy 1) at position $(x_1, y_1)$ and a second buoy (or buoy 2) at position $(x_2, y_2)$ may be found by the following:

$$d=\sqrt{(x_2-x_1)^2+(y_2-y_1)^2}$$

The speed is simply the distance the sound wave covers over a given time period. Determining the actual or current speed of sound may improve the accuracy of the system, in that the speed of sound can vary measurably.

Central processor 20 is capable of solving for the location of an acoustic event 30 using the position of the sensing elements. The square of the distance between an acoustic event located at (x, y, z) and a given sensing element i (e.g., buoy 100) may be given by the following formula:

$$(x-x_i)^2+(y-y_i)^2+z^2$$

This same distance can be covered by a sound in a time designated by $(t+t_i)$, such that the distance is $c(t+t_i)$ and t is a value that is the same for all sensors. The value $(t+t_i)$ is the absolute signal propagation time. Thus, in a fictitious ideal environment without inaccuracy or errors:

$$(x-x_i)^2+(y-y_i)^2+z^2-c^2(t+t_i)^2=0$$

Some approaches do not account for error within the calculation of location of the acoustic event, and simply focus on improving the hardware systems to reduce inaccuracy in data acquisition. However, due to the imperfect identification of sensor location, inaccuracies in measuring sound arrival time at a sensor, refraction of sound within the media, etc., the expression above is more accurately a non-zero error value:

$$\text{error}=(x-x_i)^2+(y-y_i)^2+z^2-c^2(t+t_i)^2$$

This error may be either positive or negative. For the purposes of error minimization, the absolute value of the error may be calculated simply by squaring this value:

$$e_i^2=[(x-x_i)^2+(y-y_i)^2+z^2-c^2(t+t_i)^2]^2$$

Solution of this problem involves seeking the lowest surface point in a multi-dimensional space. There may be multiple localized apparent minima, given the multiple quadratic equations. In general, equations of this sort require sophisticated non-linear programming for minimization.

However, for the present invention, the total error for all sensors of quantity "n" may be given as a simplified sum of individual errors for the sensors:

$$E(x, y, z, c, t) = \sum_{i=1}^{n} e_i^2 = \sum_{i=1}^{n} \left[(x-x_i)^2 + (y-y_i)^2 + z^2 - c^2(t+t_i)^2\right]^2$$

This linear minimization algorithm enables the use of linear processing to find the location of the acoustic event 30 with accuracy, simplifying the overall embodiment. Central processor 20 may solve for the value of the location of the acoustic event that minimizes the error represented by this equation, using the location and time data of each of the sensors, as shown in FIG. 3. Because the total error, or "E(x, y, z, c, t)" is a function of five variables, at least five sensing locations are needed within an array in order to provide sufficient data to resolve the algorithm. The elevation value "z" for the acoustic event 30 may thus be expressed and solved as function of x, y, c, and t.

An array of sensing elements is preferably distributed spatially for proper reception of the audible event. A situation where multiple sensors are aligned with respect to the direction of the propagation of sound could reduce effectiveness by reducing the dimensional differences within the various data sensing points. Preferably the deployment of the sensing elements as an array within the medium will be distributed about the anticipated location of the acoustic event 30 so that the sensors are not allineated. If multiple sensors were to fall in a straight line, aligned with the direction of the propagation of sound, then the matrix rank could fall preventing a solution. It may be advantageous, in some embodiments, particularly embodiments having mobile sensing elements, to provide additional or excess sensing elements to ensure that sufficient sensors are not allineated at the time of the acoustic event 30.

In a waterborne environment, the algorithm is suitable for elevated acoustic events 30, such as air burst detonations, based on sound impulses in the air detected at each sensing element; for example as in FIG. 1, a buoy 100 with microphone 135 located above water level may detect an air burst, taking into account that the medium for determining the speed of sound is air. As described above, acoustic events 30 underwater may be detected at buoy 100 by using hydrophone 150, with the relevant medium being water. An embodiment combining both such sensors in a single sensor element means that central processor 20 will receive a notification signal at one time of detection for sound in air, and a notification at a different time of detection for sound in water. It is possible to determine the location of the acoustic event in such circumstances if processor 20 has the capability of sorting out notification signals arising from near simultaneous acoustic events 30.

Near-simultaneous acoustic events 30 may be detected, with certain optional modifications. That is, the present invention may be configured to detect acoustic events 30 that are closely spaced in time, which may be described for convenience as having a first acoustic event and a second acoustic event. However, the present invention may be used with a plurality of near simultaneous acoustic events 30 as described herein. The central processor 20 may sort near-simultaneous acoustic events 30 with the addition of another data source or sensing element. In a simple embodiment, an array of sensing elements would thus require a minimum of six instead of five sensors. Instead of one notification signal 190 for arrival time $t_i$ for a given sensing element, e.g., buoy 100 designated as i, processor 20 will receive a block or matrix of arrival times $t_{ij}$, where j runs from 1 to the number of near-simultaneous acoustic events 30. A first sensor and first arriving time may thus be designated by $t_{11}$. The other sensors may then be processed for all possible combinations to achieve the smallest error. If n is the number of sensing elements and m is the number of acoustic events 30, then a total of $m^{n-1}$ combinations will be processed. After the location of the first acoustic event 30 is determined, the times associated with the arrival of those notification signals may be removed from consideration. The process is then repeated for the next "first sensor arriving time," or $t_{12}$. Overall, the total number of required solutions is:

$$\sum_{i=1}^{m} i^{n-1}$$

Figure 5:
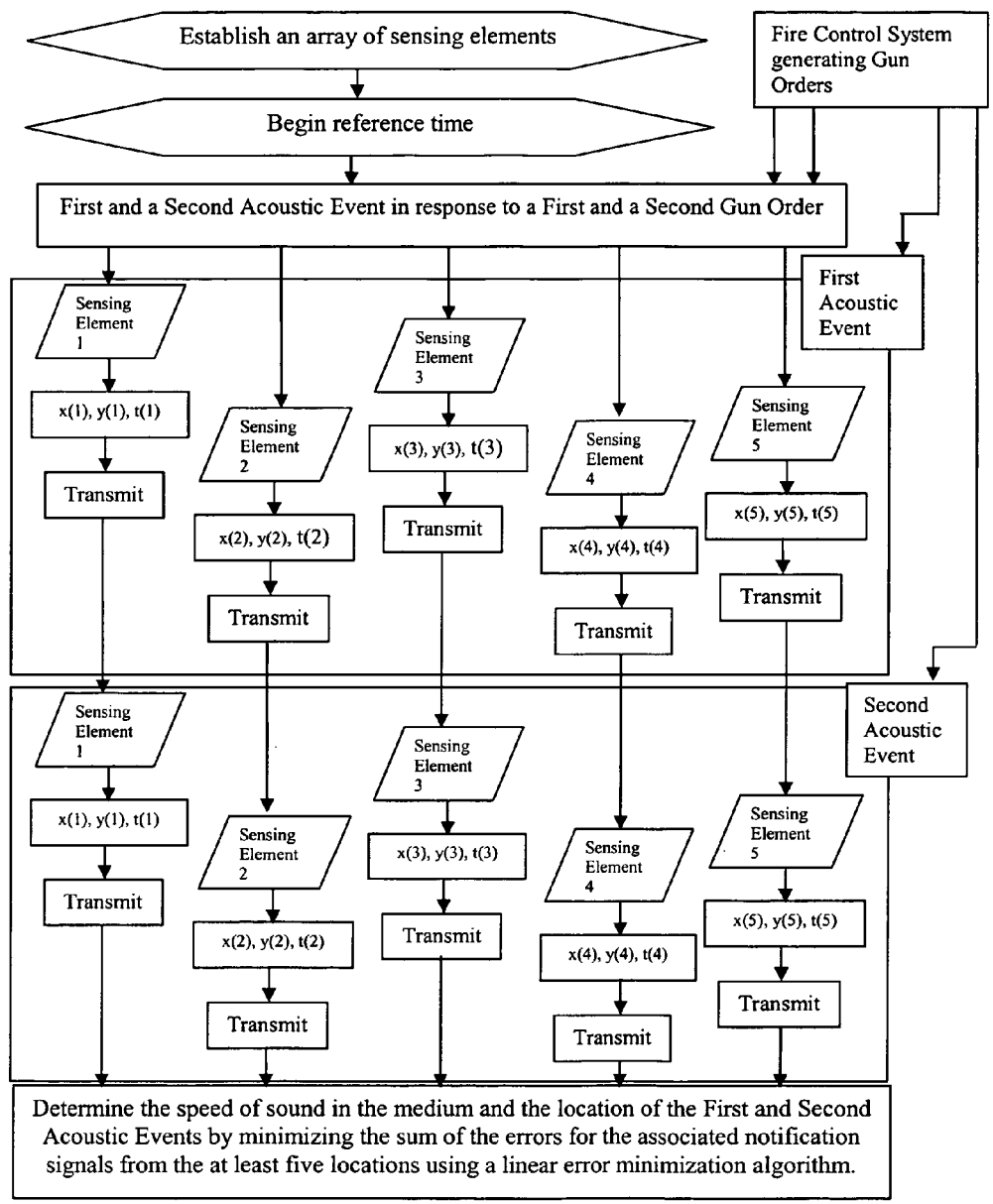
FIG. 5 is a flow chart of the data processing adapted to sensing sound from two near simultaneous acoustic events where the notification signals are associated with the acoustic events using gun orders from a fire control system.
Figure 6:
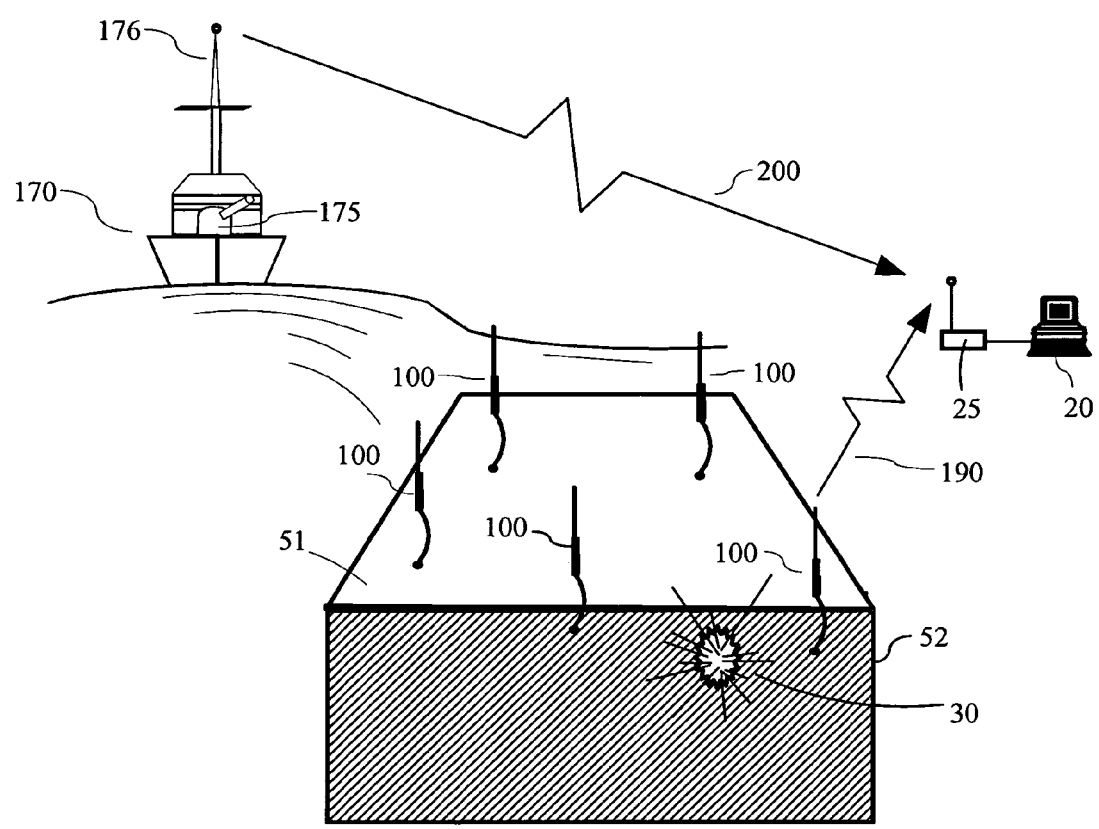
FIG. 6 is an example of a water based application of the present invention.

In some embodiments, the locations of near simultaneous acoustic events 30 may be determined alternatively by using timing information to differentiate notification signals 190 by acoustic event 30. A system generating the acoustic events 30 may provide timing information that permits the association the notification signals 190 with their respective acoustic event 30. This example may arise during a gun fire exercise, as shown in the modified flow chart of FIG. 5 and graphically in FIG. 6 for one of the near simultaneous acoustic events 30. Acoustic event 30 is a detonation of a projectile (not shown) fired by gun 175 on vessel 170; an array of sensing elements within buoys 100 are situated in area of concern 51. The sound sensed may be associated to a first or second near simultaneous acoustic event 30 by communicating a gun order time signal 200 from the gun fire control system (not shown) on vessel 170 to processor 20, preferably via receiver 25. A gun fire control system is simply a computer based system that generates gun orders to control or operate artillery, such as triggering gun 175 to fire. As shown in FIG. 5, sensing elements (e.g., buoy 100) record and transmit notification signals 190 for each of the first and second near simultaneous acoustic events 30, which transmissions are associated to the time of the gun order that caused gun 175 to fire, enabling processor 20 to differentiate among the notification signals 190 and determine the location for each of the acoustic event 30 using the linear minimization algorithm as described above. In FIG. 6, a gun order time signal 200 is shown as a radio broadcast from antenna 176 on vessel 170. The interface between antenna 170 and processor 20 may be the same communication interface 23 between the five or more sensing elements (i.e., buoys 100) and processor 20, or a different communication system. Thus, gun order time signal 200 may be communicated to processor 20 by any communication system suitable for the environment and the embodiment, such as satellite communications, cellular or other telecommunications, fiber optic, communication wiring, or other hard wired systems, microwave, etc.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A system for determining the three dimensional location of an acoustic event producing sound in a medium, comprising:

five or more sensing elements at substantially the same elevation and in spatially distributed predetermined locations with respect to the acoustic event, for sensing sound in the medium and generating notification signals upon sensing sound from the acoustic event;

a processor;

a communication interface between the five or more sensing elements and the processor for communicating the notification signals from the five or more sensing elements to the processor; and said processor is configured to determine the speed of sound in the medium and to calculate the three dimensional location of the acoustic event as a function of the times of generation of the notification signals and the respective predetermined locations of the five or more sensing elements, by using a linear minimization algorithm.

2. The system of claim 1, wherein said processor determines the speed of sound in the medium by using the notification signals from at least two of the five or more sensing elements.

3. The system of claim 1, wherein:

each of the five or more sensing elements further include a transmitter for transmitting notification signals; and the communication interface includes a receiver for receiving notification signals and communicating the notification signals to the processor.

4. The system of claim 1 further comprising a timer for generating a time signal and providing the time signal to the processor.

5. The system of claim 1, further comprising at least one sensing element in addition to the five or more sensing elements where said at least one sensing element is at substantially the same elevation as the five or more sensing elements and in a spatially distributed predetermined location with respect to the acoustic event, for sensing sound in the medium and generating notification signals upon sensing sound from an acoustic event; and said processor is further configured to determine three dimensional locations in the medium of two near simultaneous acoustic events comprising a first acoustic event and a second acoustic event, by determining a three dimensional location for the first acoustic event using a linear minimization algorithm and the times at which each of the five or more sensing elements in their respective predetermined locations sensed the sound of the two near simultaneous acoustic events, and associating notification signals with the first acoustic event, and by determining for the second acoustic event a three dimensional location by using a linear minimization algorithm and the times at which each of the five or more sensing elements in their respective predetermined locations sensed the sound of the two near simultaneous acoustic events excluding the notification signals associated with the first acoustic event.

6. The system of claim 1, wherein:

said acoustic event is a detonation of a projectile fired from a gun having a gun fire control system, wherein the gun fire control system generates a gun order time signal associated with the acoustic event;

the gun fire control system is communicably linked to a communication system for communicating the gun order time signal to the processor; and said processor is further configured to determine three dimensional locations in the medium of two near simultaneous acoustic events comprising a first acoustic event and a second acoustic event by associating notification signals with a first gun order time signal for the first acoustic event and associating notification signals with a second gun order time signal for the second acoustic event, and determining the three dimensional location for each of the two near simultaneous acoustic events as a function of the notification signals associated with that acoustic event and the predetermined locations of the five or more sensing elements, by using a linear minimization algorithm.

7. A system for determining the three dimensional location of an acoustic event producing sound in a medium, comprising:

five or more sensing elements at substantially the same elevation and in spatially distributed locations with respect to the acoustic event, for sensing sound in the medium and generating notification signals upon sensing sound from the acoustic event;

a processor;

a positioning system capable of determining the location of each of the five or more sensing elements, generating one or more location signals having location information of the five or more sensing elements, and providing the location signal to the processor;

a communication interface between the five or more sensing elements and the processor for communicating the notification signals from the five or more sensing elements to the processor; and said processor is configured to determine the speed of sound in the medium and to calculate the three dimensional location of the acoustic event as a function of the times of generation of the notification signals and the respective locations of the five or more sensing elements, by using a linear minimization algorithm.

8. The system of claim 7, wherein said processor determines the speed of sound in the medium by using the notification signals from at least two of the five or more sensing elements and the corresponding location signals for the at least two of the five or more sensing elements.

9. The system of claim 7, wherein each of the five or more sensing elements further include a transmitter for transmitting the notification signals; and the communication interface includes a receiver for receiving the notification signals and communicating the notification signals to the processor.

10. The system of claim 7, further comprising at least one sensing element in addition to the five or more sensing elements where such at least one sensing element is at substantially the same elevation as the five or more sensing elements and in a spatially distributed location with respect to the acoustic event, for sensing sound in the medium and generating notification signals upon sensing sound from an acoustic event; and said processor is further configured to determine three dimensional locations in the medium of two near simultaneous acoustic events comprising a first acoustic event and a second acoustic event, by determining a three dimensional location for the first acoustic event using a linear minimization algorithm and the times at which each of the five or more sensing elements in their respective locations sensed the sound of the two near simultaneous acoustic events, and associating notification signals with the first acoustic event, and by determining for the second acoustic event a three dimensional location by using a linear minimization algorithm and the times at which each of the five or more sensing elements in their respective locations sensed the sound excluding the notification signals associated with the first acoustic event.

11. The system as set forth in claim 7, wherein said medium is water, and wherein at least one of said five or more sensor elements is attached to a buoy.

12. The system as set forth in claim 7, wherein said positioning system includes at least one global positioning satellite receiver.

13. The system as set forth in claim 7, wherein said positioning system includes radar.

14. The system as set forth in claim 7, wherein said positioning system is optical.

15. The system of claim 7, wherein:

said acoustic event is a detonation of a projectile fired from a gun having a gun fire control system, wherein the gun fire control system generates a gun order time signal associated with the acoustic event;

the gun fire control system is communicably linked to a communication system for communicating the gun order time signal to the processor; and said processor is further configured to determine three dimensional locations in the medium of two near simultaneous acoustic events comprising a first acoustic event and a second acoustic event by associating notification signals with a first gun order time signal for the first acoustic event and associating notification signals with a second gun order time signal for the second acoustic event, and determining the three dimensional location for each of the two near simultaneous acoustic events as a function of the notification signals associated with that acoustic event and the locations of the five or more sensing elements, by using a linear minimization algorithm.

16. A method for determining the three dimensional location of an acoustic event producing sound waves in a medium, comprising:

sensing sound waves of the acoustic event from at least five locations that are at substantially the same elevation and are spatially distributed with respect to the acoustic event;

determining the at least five locations from which the sound waves are sensed;

recording the time at which the sound waves are sensed at each of the at least five locations;

determining the speed of sound in the medium;

associating the time of sensing the sound waves with the location of each of the at least five locations; and determining the three dimensional location of the acoustic event as a function of the at least five locations and the times of sensing sound waves of the acoustic event at the at least five locations, using a linear minimization algorithm.

17. The method according to claim 16, wherein:
the step of determining the speed of sound in a medium is a function of the distance between at least two of the at least five locations and the difference in their respective times of sensing sound waves from an acoustic event.

18. A method for determining the three dimensional locations of two near simultaneous acoustic events having a first acoustic event and a second acoustic event, each producing sound waves in a medium, comprising:
sensing sound waves of the two near simultaneous acoustic events from at least six locations that are at substantially the same elevation and are spatially distributed with respect to the acoustic event;
determining the at least six locations from which the sound waves are sensed;
recording the time at which the sound waves are sensed at each of the at least six locations;
determining the speed of sound in the medium;
associating the times of sensing the sound waves with the location of each of the at least six locations;
determining a three dimensional location for the first acoustic event as a function of the at least six locations and the times of sensing sound waves of the acoustic events at the at least six locations, using a linear minimization algorithm, and associating notification signals with the first acoustic event; and
determining for the second acoustic event a three dimensional location as a function of, excluding the times of sensing and locations associated with the first acoustic event, the at least six locations and the times of sensing sound waves of the acoustic events at the at least six locations, using a linear minimization algorithm.

19. The method according to claim 18, wherein:
the step of determining the speed of sound in a medium is a function of the distance between at least two of the at least six locations and the difference in their respective times of sensing sound waves from an acoustic event.

* * * * *